United States Patent
Kaibach et al.

[11] Patent Number: 6,132,152
[45] Date of Patent: Oct. 17, 2000

[54] UNDERCUT-ENGAGING DOWEL

[75] Inventors: Werner Kaibach, Buchloe; Stefan Raber, Kaufering; Hans-Jürgen Negele, Denklingen, all of Germany

[73] Assignee: Hilti Aktiengesellschaft, Schaan, Liechtenstein

[21] Appl. No.: 09/320,124

[22] Filed: May 25, 1999

[30] Foreign Application Priority Data

Jun. 10, 1998 [DE] Germany .......................... 198 25 884

[51] Int. Cl.$^7$ .............................. F16B 13/04; F16B 13/06
[52] U.S. Cl. ............................ 411/54.1; 411/30; 411/57.1
[58] Field of Search ................................. 411/30, 31, 32, 411/54, 54.1, 57.1, 65, 66

[56] References Cited

U.S. PATENT DOCUMENTS

| | | | |
|---|---|---|---|
| 4,929,134 | 5/1990 | Bergner | 411/30 |
| 4,940,372 | 7/1990 | Fischer | 411/32 |
| 5,059,073 | 10/1991 | Revol et al. | 411/65 |
| 5,116,176 | 5/1992 | Yousuke | 411/57.1 |
| 5,885,031 | 3/1999 | White | 411/32 X |
| 5,921,733 | 7/1999 | Kaibach et al. | 411/31 |
| 6,012,887 | 1/2000 | Kaibach et al. | 411/54.1 X |

*Primary Examiner*—Neill Wilson
*Attorney, Agent, or Firm*—Brown & Wood, LLP

[57] ABSTRACT

A dowel including an anchor rod (2; 22) having a load application element at one of its longitudinal ends and a head (3; 23), a diameter of which increases toward the free end of the anchor rod, at its opposite end, an expansion sleeve (4; 24) having a bore through which the anchor rod (2; 22) extends and a plurality of expansion tabs (5; 25) separated from each other by longitudinal slots (6; 26) and extending from a circumferential groove (7) toward the head (3; 23), the expansion tabs (5; 25) expanding radially, upon the expansion sleeve (4; 24) being displaced over the head (3; 23), and a substantially ring-shaped member (8; 28) arranged in the circumferential groove (7) and substantially filling out the circumferential groove (7; 27) in an expanded condition of the expansion tabs (5; 25).

13 Claims, 3 Drawing Sheets

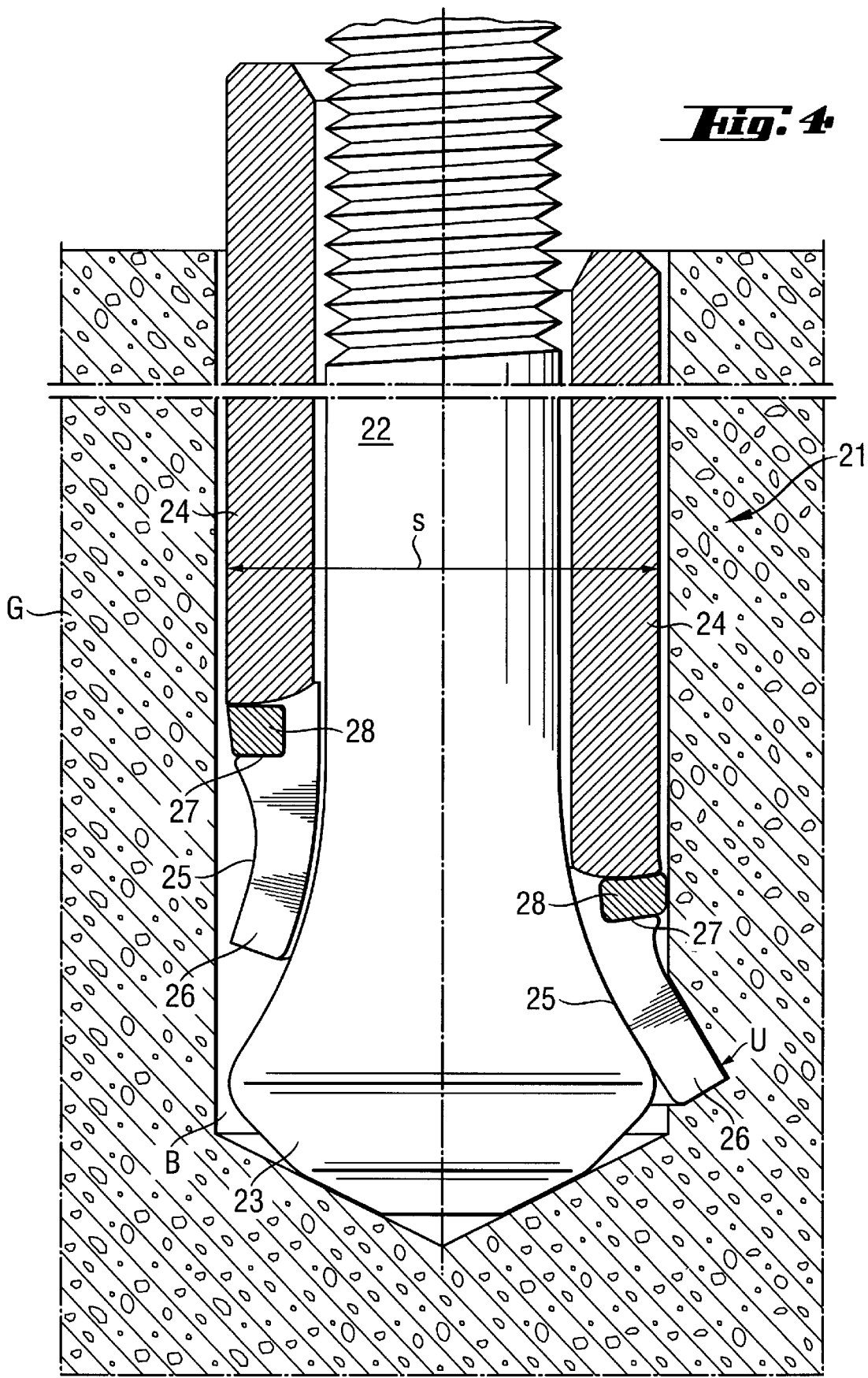

UNDERCUT-ENGAGING DOWEL

BACKGROUND OF THE INVENTION

1. Field of the Invention

The present invention relates to an undercut-engaging dowel including an anchor rod having load application means at one of its end and a head, a diameter of which increases to a free end of the anchor rod, at an opposite end, and an expansion sleeve having a central bore through which the anchor rod extends, a circumferential groove, and a plurality of expansion tabs separated from each other by longitudinal slots and extending from the circumferential groove toward the head with the expansion tabs expanding radially, upon the expansion sleeve being displaced over the head.

2. Description of the Prior Art

In attachment systems, in which small spacing distances between axes and edges should be provided, form lockingly anchoring elements are used. In such systems, where spacing between the edges and axes is of a critical importance, in addition to anchoring of setbolts in structural components by casting them in a liquified mass which later solidifies, undercut formlocking means is used. When such attachment systems are used, an undercut-engaging dowel is anchored in a bore in which an undercut is formed by a special tool in the vicinity of the bore bottom. For anchoring the dowel, an anchor rod, together with an expansion sleeve mounted thereon, is inserted into the bore, and the expansion tabs of the expansion sleeve expand radially due to relative movement between the sleeve and the anchor rod. The expansion tabs, which expand into the undercut, form a formlocking connection with structural component.

An undercut-engaging dowel according to another embodiment does not require, for its anchoring, a preliminary formation of an undercut with a special tool. Rather, the dowel itself automatically forms an undercut upon being anchored. The formation of the undercut in this case is effected by rotation of the expansion sleeve while it is being driven, in the setting direction, over the widening head of the anchor rod by axial blows. The expansion tabs of the sleeve are equipped with cutters which form an undercut in a bore by milling or chiseling the bore wall. After the setting process has ended, the radially expanded tabs formlockingly engage the undercut formed in the bore. In addition to these undercut self-cutting systems, also known are undercut systems with which the undercut is formed without the expansion sleeve being rotated.

Undercut-engaging dowel, which is anchored in a preliminary formed undercut, has a very high resistance to displacement under a load and achieves, to the most possible extent, the carrying capacity of cast-in setbolt. Nevertheless, the expenses associated with anchoring of undercut-engaging dowels in bores with preliminary formed undercuts are rather high. The undercut self-cutting dowels such e.g., as disclosed in European Patent EP-B-O 217 053, have a noticeably smaller setting expenses. However, the resistance of these dowels to the displacement under load is very weak and approaches more to that of conventional force-lockingly anchored expansion anchors than to that of cast-in setbolts.

Accordingly, an object of the present invention is an undercut-engaging dowel having a resistance to displacement under load which approaches to that of a cast-in setbolt and at the same time can be formlockingly anchored in a structural component in a simple manner and without excessive expenses.

SUMMARY OF THE INVENTION

This and other objects of the present invention, which will become apparent hereinafter, are achieved by providing an undercut-engaging dowel which includes an anchor rod having load-application means at one of its longitudinal ends and a head the diameter of which increases to a free end of the anchor rod, at another of the longitudinal ends. The dowel further includes an expansion sleeve having a central bore through which the anchor rod extends, a circumferential groove, and a plurality of expansion tabs separated from each other by longitudinal slots and extending from the circumferential groove toward the head, with the expansion tabs expanding radially upon the expansion sleeve being displaced over the head. A substantially ring-shaped member is arranged in the circumferential groove and substantially fills out the circumferential groove in an expanded condition of the expansion tabs.

The circumferential groove represents a purposeful weakening of the sleeve material and forms a plastic hinge for the radially expanding tabs so that the tabs deflect, upon the displacement of the expansion sleeve over the head, at a predetermined location. Within a bore, a relative large clearance is formed in the region of the circumferential groove between the expansion sleeve and the bore wall. This clearance adversely affects the displacement resistance of the undercut-engaging dowel. According to the invention, in the anchored condition of the undercut-engaging dowel, the ring-shaped member fills out the circumferential groove. As a result, the annular clearance between the expansion sleeve and the bore wall is small in the region of the plastic hinge. Thereby, the carrying capacity of the inventive undercut-engaging dowel approaches closely the carrying capacity of a cast-in setbolt. The ring-shaped body advantageously is mounted in the circumferential groove before setting of the dowel. However, it does not make the setting process more difficult or prevents it altogether.

According to an advantageous embodiment of the present invention, the diameter of the ring-shaped member is selected in a range $0.7s \leq a \leq 1.2s$, preferably, $0.8s \leq a \leq 1.1s$, where a is the outer diameter of the ring-shaped member and s is the largest diameter of the expansion sleeve. The selected range of the outer diameter of the ring-shaped member insures an adequate relationship between the carrying capacity of the dowel and its resistance to the displacement under a load. When the outer diameter of the ring-shaped member exceeds the largest diameter of the expansion sleeve, jamming takes place during driving of the dowel into the bore. This jamming, e.g., at an overhead mounting, contributes to the prevention of the dowel from falling out. Thus, the inventive undercut-engaging dowel simplifies the setting process.

With the axial height h of the ring-shaped member selected in a range $0.05s \leq h \leq 1.5s$, preferably, $0.1s \leq h \leq 0.8s$, the plastic hinge-forming groove having increased axial dimensions is adequately filled out in the anchored condition of the dowel with radially expanded expansion tabs. In this way, the possible weak points of the expansion sleeve, which might have adversely affect the displacement behavior of the set dowel under a load, are eliminated.

The ring-shaped member has a thickness which substantially corresponds to the radial depth of the circumferential groove. In this case, the inner diameter of d of the ring-shaped body is selected in range $0.5s \leq d \leq 0.9s$. The selected range of the inner diameter of the ring-shaped body, together with the selected range of the outer diameter for each nominal diameter of the dowel, provides a thickness of the ring-shaped member necessary for achieving a displacement behavior under the load which corresponds to the carrying capacity of a setbolt.

The ring-shaped member can be formed of both plastics and metal. These materials insure an adequate flexibility in manufacturing the inventive dowel so that it can meet the specific application requirements.

For mounting the ring-shaped member in the circumferential groove, it is advantageous when it is provided with a separation slot along its circumference. Preferably, the dowel is formed resiliently deformable.

The ring-shaped member need not necessarily be formed as a one-piece member. According to one embodiment of the invention, it can be formed of several segments. In this case, a retaining element can be provided in the region of the plastic hinge to prevent the segments, which form the ring-shaped member, form falling out of the circumferential groove. The retaining element can be formed, e.g., as a small undercut or be formed as a hose-like member, e.g., a shrinkdown plastic tubing that surrounds the hinge region.

Advantageously, the ring-shaped member is formed of a deformable material, e.g., silicone or a lead compound. The radial expansion of the expansion tabs during the setting process reduces the free volume in the region of the plastic hinge. The resulting plastic deformation presses a portion of the ring-shaped member material out of the circumferential groove. The pressed-out material of the ring-shaped member projects beyond the outer circumference of the expansion sleeve and abuts the bore wall. In this way, the free space, which remains at the end of the setting process between the expansion sleeve and the bore wall, can additionally be filled out.

The ring-shaped member according to the present invention, which fills out the circumferential groove, which is formed in the expansion sleeve and forms the plastic hinge, can be used with any type of an undercut-engaging dowel. However, its use is particularly advantageous in the undercut-self-cutting systems. Because of the action of forces, which are generated during the formation of an undercut, the structural component, in particular in its transition region between the bore wall and the undercut, can have a somewhat reduced stability. The ring-shaped member, which is provided in the plastic hinge region, supports the transition region and thereby increases the carrying capacity of the undercut self-cutting dowel.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 4 shows an axial cross-sectional view of a second embodiment of a undercut-engaging dowel according to the present invention.

DETAILED DESCRIPTION OF THE

Figure 1:
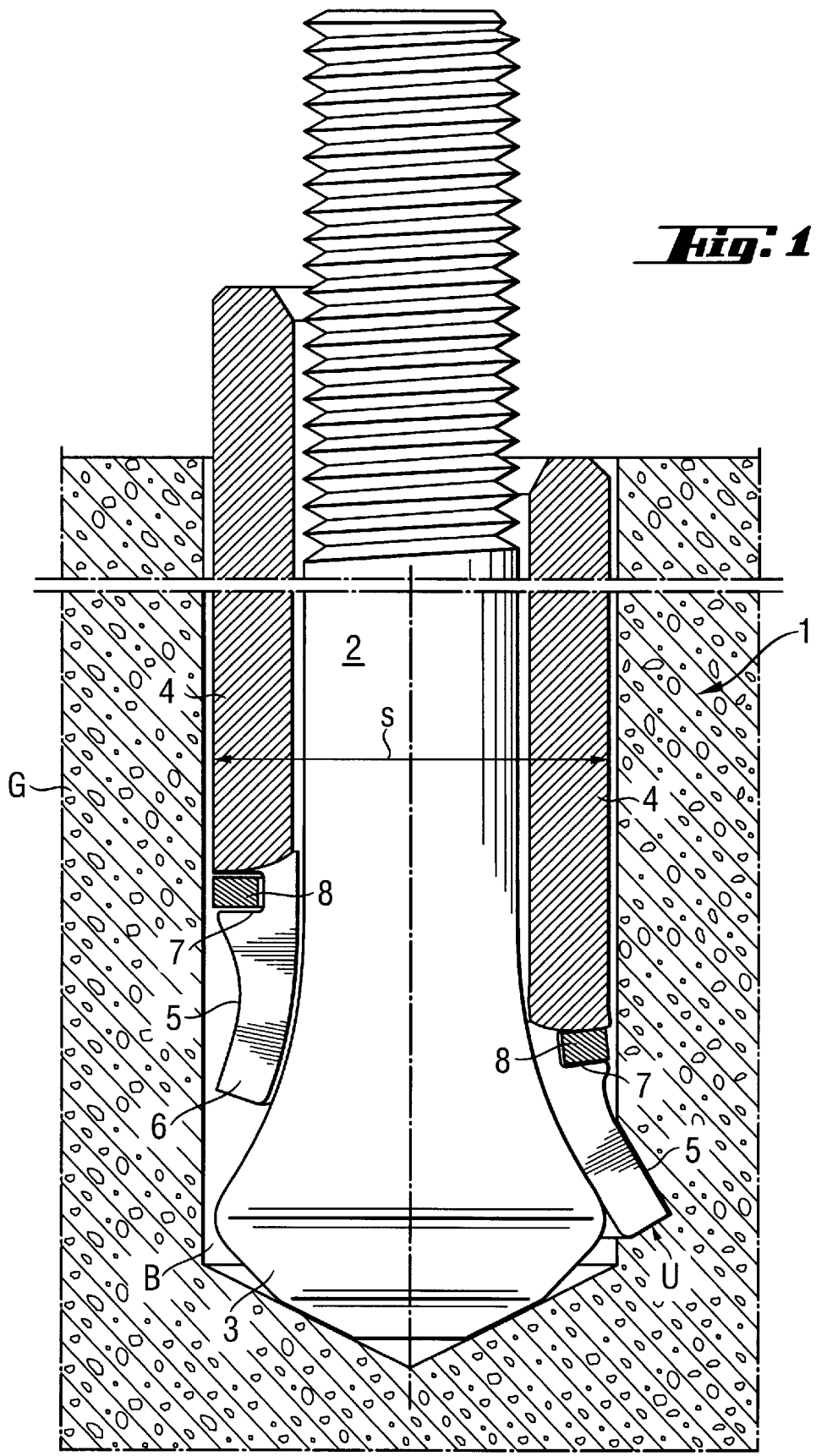
FIG. 1 shows an axial cross-sectional view of a first embodiment of an undercut-engaging dowel according to the present invention.

In FIGS. 1 and 4, the left half of a respective drawing shows a dowel according to first and second embodiments, respectively, of the present invention in its initial position. The right half of the respective drawing shows the undercut self-cutting dowel in its anchoring position with its expansion tabs being radially expanded. The dowel, which is shown in FIG. 1, is generally designated with a reference numeral 1. The dowel 1 is anchored in a bore B formed in a structural component G formed, e.g., of concrete. The dowel 1, which is shown in FIG. 1, includes an anchor rod 2 provided at its rear, in the use position, end with load application means 2a, e.g., an outer or inner thread. At its opposite, front end, the anchor rod 2 has a head 3 the outer diameter of which increases toward a free end of the anchor rod 2 conically or trumpet-like. An expansion sleeve 4 is displaceably supported on the anchor rod 2. The expansion sleeve 4 has a central bore through which the anchor rod 2 extends. In its region adjacent to the head 3, the expansion sleeve 4 has a plurality of expansion tabs 5 which are separated by substantially axially extending slots 6 and which are formed, preferably, integrally with the body of the sleeve 4. The expansion tabs 5 extend from a plastic hinge, which is formed by a substantially radial circumferential groove 7 formed in the circumferential surface of the expansion sleeve 4, to the head 3 of the anchor rod 2. According to the present invention, a ring-shaped member 8 is arranged in the circumferential groove 7. The ring-shaped member 8 has dimensions such that it does not interfere with the radial expansion of the expansion tabs 5 upon displacement of the expansion sleeve 4 over the head 3. In the anchoring condition of the dowel in which the expansion tabs are engaged in an undercut U formed in the bore B, the ring member 8 fills out the circumferential groove 7 to the most possible extent.

Figure 2:
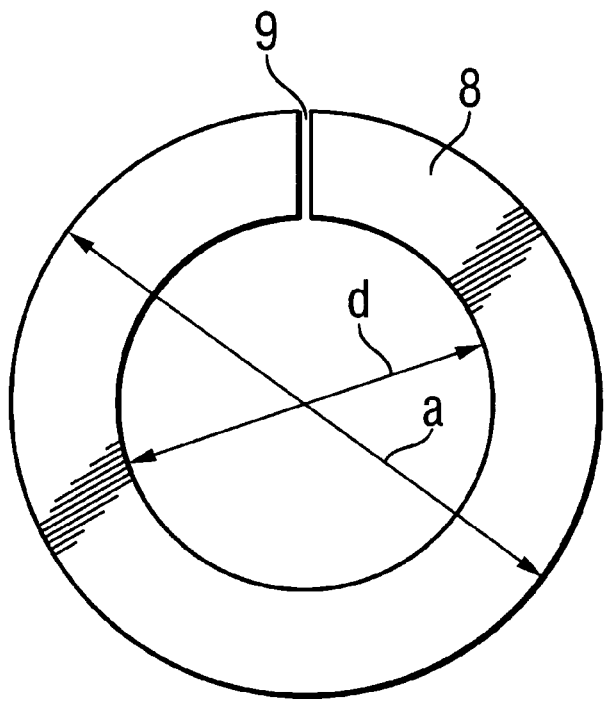
FIG. 2 shows a plan view of a ring member according to the present invention which forms part of the dowel shown in FIG. 1.
Figure 3:
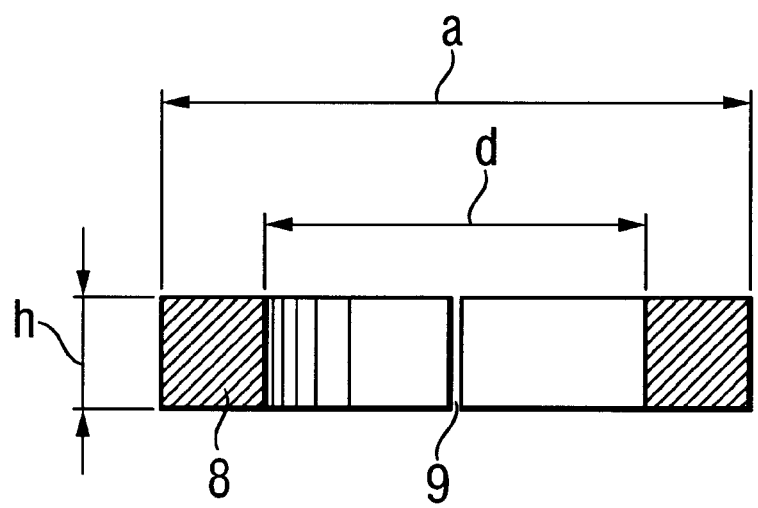
FIG. 3 shows a cross-sectional view of the ring member.

The ring-shaped member 8 is shown separately in FIGS. 2–3. To facilitate mounting, the ring-shaped member 8 is provided with a separation slot 9. The out diameter a of the ring member 8 corresponds to the most possible extent to the largest diameter s of the expansion sleeve 4 and is selected in a range $0.7s \leq a \leq 1.2s$, preferably, $0.8s \leq a \leq 1.1s$. If the diameter a of the ring-shaped member 8 is greater than the largest diameter s of the expansion sleeve 4, jamming would take place during the insertion of the dowel 1 into the bore B which, at the overhead mounting, serves as a safety measure. The axial height h of the ring member 8 substantially corresponds to the width of the circumferential groove 7. Advantageously, the axial height h is selected in a range $0.05s \leq h \leq 1.5s$, preferably, $0.1s \leq h \leq 0.8s$. The inner diameter d of the ring-shaped member 8 is selected in a range $0.5s \leq d \leq 0.9s$. Here as elsewhere, s designates the largest outer diameter of the expansion sleeve 4. The ring-shaped member 8 can be formed of either plastics or metal. It need not necessarily be formed as a one-piece part. The ring-shaped member 8 also can be formed of several segments.

FIG. 4 shows an embodiment of an undercut-engaging dowel according to the present invention in which the ring member is formed of a plastically deformable material, e.g., silicone composition or lead. The undercut-engaging dowel 21, which is shown in FIG. 4, substantially corresponds to the dowel 1 shown in FIG. 1. The elements of the dowel 21 similar to those of the dowel 1 are designated with the same reference numerals increased by 20. As shown in the left half of FIG. 4, the ring-shaped member 28 completely fills the circumferential groove 27, which is formed in the circumferential surface of the expansion sleeve 24, in the initial position of the dowel 1. For anchoring the dowel 21 in the bore B of the structural component G, the expansion sleeve 24 is driven over the head 23 of the anchor rod 22, and the expansion tabs 25 expand radially into the undercut U formed in a bottom region of the bore B. In case of self-cutting system, the expansion sleeve 24 will be rotated upon being driven over the head 23 of the anchor rod 22, with the radially expanding expansion tabs 25 automatically forming the undercut U. Upon the radial expansion of the expansion tabs 25, the volume of the circumferential groove 27 is reduced. As shown in the right half of FIG. 4, the ring-shaped member 28 becomes so plastically deformed that a portion of its circumference project from the groove 7 and projects beyond the largest diameter S of the expansion sleeve 24. The projecting portion of the ring-shaped member 28 is supported against the bore wall in the transitional region between the bore wall and the undercut U. This additionally stiffens the attachment system and increases the carrying capacity of the dowel 21.

Though the present invention was shown and described with references to the preferred embodiments, various modifications thereof will be apparent to those skilled in the art and, therefore, it is not intended that the invention be limited to the disclosed embodiments of details thereof, and departure can be made therefrom within the spirit of the appended claims.

What is claimed is:

1. An undercut-engaging dowel, comprising an anchor rod (2; 22) having load application means at one of longitudinal ends thereof and a head (3; 23), the diameter of which increases to a free end of the anchor rod, at another of the longitudinal ends thereof, an expansion sleeve (4; 24) having a central bore through which the anchor rod (2; 22) extends, a circumferential groove (7; 27), and a plurality of expansion tabs (5; 25) separated from each other by longitudinal slots (6; 26) and extending from the circumferential groove (7) toward the head (3; 23), the expansion tabs (5; 25) expanding radially, upon the expansion sleeve (4; 24) being displaced over the head (3; 23); and a substantially ring-shaped member (8; 28) arranged in the circumferential groove (7) and substantially filling out the circumferential groove (7; 27) in an expanded condition of the expanded condition of the expansion tabs (5; 25) for increasing resistance of the dowel in an anchoring condition thereof, to displacement under a load.

2. A dowel according to claim 1, wherein the ring-shaped member (8; 28) has a diameter (a) selected in a range. $7s \leq a \leq 1.2s$, where s is a largest outer diameter of the expansion sleeve (4; 24).

3. A dowel according to claim 2, wherein the ring-shaped member (8; 28) has a diameter (a) selected in a range $0.8s \leq a \leq 1.1s$.

4. A dowel according to claim 2, wherein the ring-shaped member (8; 28) has an axial height selected in a range $0.05s \leq h \leq 1.5s$.

5. A dowel according to claim 4, wherein the ring-shaped member (8; 28) has an axial height selected in a range $0.1s \leq h \leq 0.8s$.

6. A dowel according to claim 1, wherein the ring-shaped member (8; 28) has a thickness substantially corresponding to a radial depth of the circumferential groove (7: 27).

7. A dowel according to claim 2, wherein the ring-shaped member (8; 28) has an inner diameter selected in a range $0.5s \leq d \leq 0.9s$.

8. A dowel according to claim 1, wherein the ring-shaped member is formed of one of plastics and metal.

9. A dowel according to claim 1, wherein the ring-shaped member (8) has an axially extending separation slot (9).

10. A dowel according to claim 1, wherein the ring-shaped member is radially resiliently deformable.

11. A dowel according to claim 1, wherein the ring-shaped member is formed as a segmented member.

12. A dowel according to claim 1, wherein the ring-shaped member (28) is formed of a deformable material.

13. A dowel according to claim 1, wherein the ring-shaped member (28) is formed of one of silicone and a lead compound.

* * * * *